United States Patent
Hamamoto et al.

(10) Patent No.: US 7,980,114 B2
(45) Date of Patent: Jul. 19, 2011

(54) ELECTRONIC BALANCE

(75) Inventors: Hiroshi Hamamoto, Kyoto (JP); Sugio Tsukada, Kyoto (JP); Tsuyoshi Sato, Kyoto (JP); Koji Hattori, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 287 days.

(21) Appl. No.: 12/297,624

(22) PCT Filed: Apr. 28, 2006

(86) PCT No.: PCT/JP2006/309037
§ 371 (c)(1),
(2), (4) Date: Oct. 17, 2008

(87) PCT Pub. No.: WO2007/125602
PCT Pub. Date: Nov. 8, 2007

(65) Prior Publication Data
US 2009/0100899 A1    Apr. 23, 2009

(51) Int. Cl.
*G01N 27/00* (2006.01)
(52) U.S. Cl. ...................................................... 73/1.03
(58) Field of Classification Search .................. 73/1.03; 177/226, 50
See application file for complete search history.

(56) References Cited

U.S. PATENT DOCUMENTS 5,058,422 A * 10/1991 Shimauchi ..................... 73/1.13

FOREIGN PATENT DOCUMENTS

| JP | 01221623 A | * | 9/1989 |
| JP | 03-054420 | | 3/1991 |
| JP | 03-226628 | | 10/1991 |
| JP | 07-128117 | | 5/1995 |
| JP | 2000-039536 | | 2/2000 |
| JP | 2002-214033 | | 7/2002 |

OTHER PUBLICATIONS

Chinese First Examination Report of China Patent Application No. 2006800517191, dated Jan. 22, 2010.

* cited by examiner

*Primary Examiner* — Hezron Williams
*Assistant Examiner* — Tamiko D Bellamy
(74) *Attorney, Agent, or Firm* — J.C. Patents

(57) ABSTRACT

An electronic balance is provided, in which a tolerance resulting from temperature variation is variable and a frequency for sensitivity calibration corresponds to the tolerance. A load detecting portion 1 detects a load of an object to be weighed 12, a processing portion 2 converts a detecting signal from the load detecting portion 1 into a mass value, transmits the mass data to a display portion 3, and controls a sensitivity calibrating mechanism 6a to perform a sensitivity calibration by increasing or reducing internal weights 13 on the load detecting portion 1. An operation control program of the processing portion 2 is built with a tolerance input function 21, a sensitivity calibration execution condition calculating function 22, and a sensitivity calibration execution determining function 24. Whenever the temperature variation reaches or exceeds an allowable temperature variation ΔT, a sensitivity calibration is performed.

1 Claim, 3 Drawing Sheets

ELECTRONIC BALANCE

BACKGROUND OF THE INVENTION

1. Field of the Invention

The present invention generally relates to an electronic balance for weighing the mass of an object, in particular, to an electronic balance capable of performing a sensitivity calibration by using internal weights.

2. Description of Related Art

Generally, an electronic balance is configured as follows. A load sensor installed in a load detecting mechanism is used to detect a load resulting from loading an object to be weighed. A digital conversion data generated by digitalizing a detected signal is minutely collected, and limited n data is averaged by, for example, a moving average method. In addition, the averaged data is converted to a mass value in an operation processing by being multiplied with a sensitivity calibration coefficient or a span coefficient, and the mass value as a weighed value is shown on a display or printed out by a printer.

As for the electronic balance, and particularly for a high precision electronic balance, the ratio between a maximum weighed value and a minimum weighed unit value even reaches 1/1,600,000-1/2,000,000 (0.5 PPM). However, electronic parts and other components have stronger temperature dependence, or their electronic or mechanical properties may vary with time. For example, among the components, a permanent magnet has a magnetic field intensity with a temperature dependence of 200 to 400 PPM/° C., and a year-varying property of 10 PPM/month etc. Therefore, various strategies on weighing, such as temperature correction in terms of hardware and software, are adopted, or a precise adjustment is performed during manufacturing. However, a limit of the temperature dependence of the span is controlled in a range of approximately 1 to 2 PPM/° C., even if the ambient temperature variation during weighing is only 1° C. Further, when an object of a weight close to the weighted value is weighed, the reading may have an error of 2-4 counts of a limited value. Therefore, the disadvantage of an electronic balance is that if the electronic balance is not being used in a constant room temperature, it is impossible to perform a reliable weighing.

The electronic balance generally has a calibration function. External weights with known mass or internal weights of the electronic balance for sensitivity calibration are loaded on a load detecting portion to update the sensitivity coefficient for mass conversion, and the calibration is performed to make the weighed display value be consistent with the mass of the weights for calibration. This operation is usually called a sensitivity calibration or a pan calibration. However, the sensitivity calibration should be performed, at any time on demands, to eliminate the sensitivity variation not only during the setting of the electronic balance but also due to year variation of any component in the electronic balance, or performed when a preset temperature variation occurs, or performed periodically in a use state at a preset interval (for example, referring to Japanese Patent Publication No. 2002-214033).

In view of the above, the conventional electronic balance generally has a sensitivity calibration function and is configured as follows. The weighed value is shown on a display or is printed out by a printer. Thereby, through frequent sensitivity calibration, a reliable weighing can be performed. The weighed value is obtained by multiplying a load detecting signal from a load sensor with the calibrated sensitivity coefficient, and then converting the product into a mass value. The load sensor detects the load resulting from loading the object to be weighed. However, as the calibration is performed at any time on demands, for an electronic balance with a sensitivity temperature coefficient of 10 PPM and a maximum weighed value of 300.000 g, in order to control the tolerance resulting from the temperature variation to be smaller than or equal to a minimum weighed unit value, the sensitivity calibration has to be performed each time the temperature varies by 0.33° C. Particularly, even if the user determines that a tolerance at such degree is unnecessary for the weighing precision, the electronic balance may still carry out the automatic sensitivity calibration during the weighing or the key pressing operation, so the weighing or the key pressing operation may be interrupted, and the weighing efficiency decreases.

SUMMARY OF THE INVENTION

Accordingly, in view of the aforesaid event, the present invention is directed to an electronic balance with a high weighing efficiency, and capable of reducing the execution frequency of sensitivity calibration according to a required weighing precision.

The electronic balance of the present invention includes a load detecting portion for detecting a load of an object to be weighed and outputting a detecting signal; a mass calculating unit for multiplying the detecting signal by a sensitivity coefficient, so as to calculate the mass of the object to be weighed; a temperature detecting unit for detecting a temperature of the load detecting portion; and a sensitivity calibrating unit with internal weights. The electronic balance is capable of automatically performing a sensitivity calibration when a temperature variation after a previous sensitivity calibration is detected and exceeds a certain value. The electronic balance also includes a tolerance input unit for inputting a tolerance resulting from the temperature variation with respect to a maximum weighed value; an allowable temperature variation calculating unit for calculating an allowable temperature variation corresponding to the tolerance; and a sensitivity calibration execution determining unit for detecting whether the allowable temperature variation is generated or not, so as to determine whether to execute the sensitivity calibration or not. In addition, whenever the allowable temperature variation is generated, an automatic sensitivity calibration is executed.

The electronic balance of the present invention further includes a tolerance input unit for inputting a tolerance resulting from the temperature variation with respect to a predictable approximate weighed value and a weighed value of the object to be weighed; an allowable temperature variation calculating unit for calculating an allowable temperature variation corresponding to the tolerance; and a sensitivity calibration execution determining unit for detecting whether the allowable temperature variation is generated or not, so as to determine whether to execute the sensitivity calibration or not. In addition, whenever the allowable temperature variation is generated, an automatic sensitivity calibration is executed.

Further, a tolerance, smaller than the input tolerance during the automatic sensitivity calibration, is input into the electronic balance of the present invention. When the balance reaches the temperature variation corresponding to the tolerance, an alarm is shown on a display portion.

Effect of the Present Invention

According to application, a tolerance corresponding to the maximum weighed value is input, or a sample mass generally serving as an object in weighing is input to adjust the execution times of automatic sensitivity calibration. In this manner, it is not necessary to frequently carry out the sensitivity calibration, such that the interruption in the operation is reduced, and the operation efficiency is greatly enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE SYMBOLS

Figure 1:
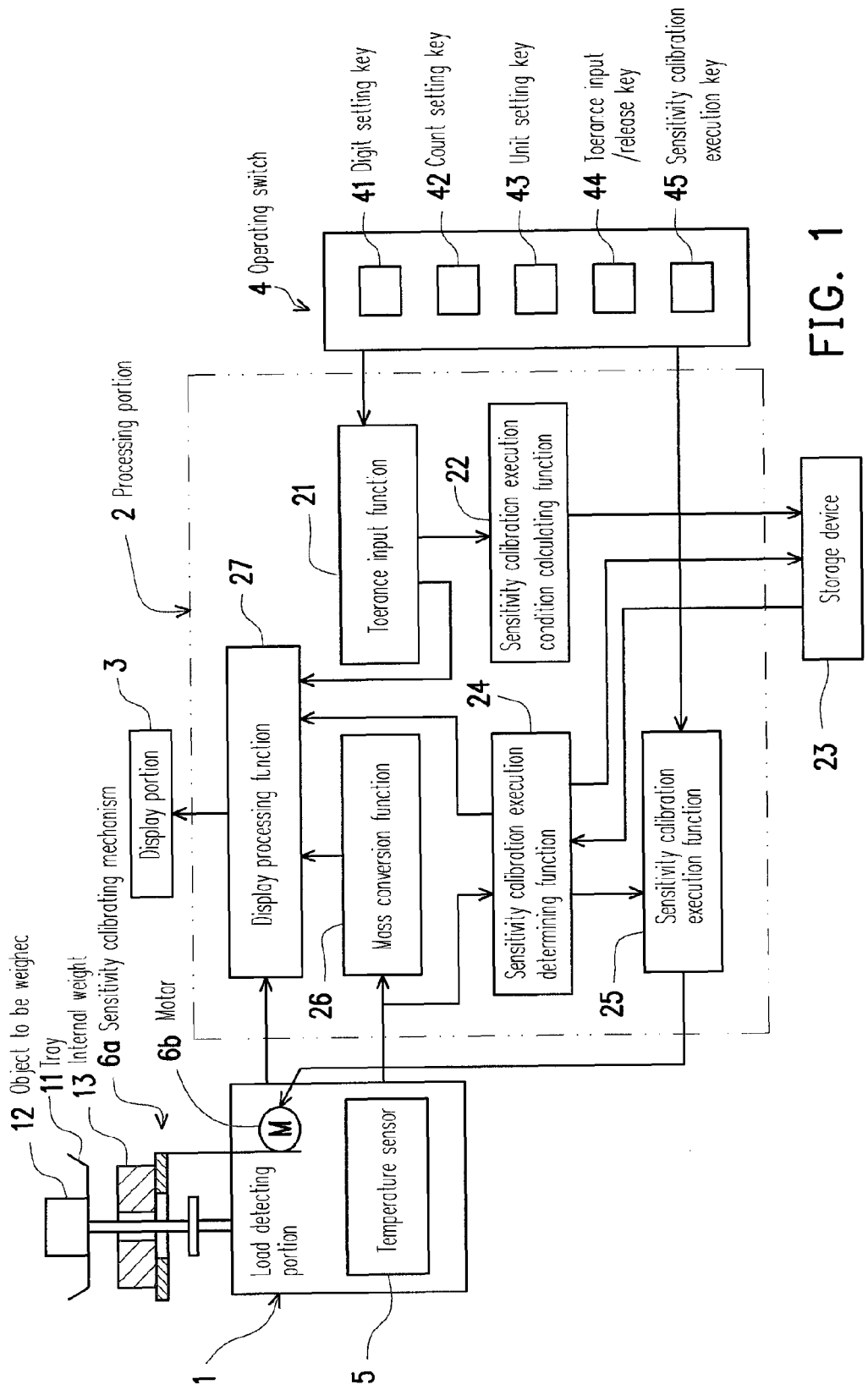
FIG. 1 is a block diagram showing the configuration of an electronic balance of the present invention.

1 Load detecting portion
11 Tray
12 Object to be weighed
13 Internal weight
2 Processing portion
21 Tolerance input function
22 Sensitivity calibration execution condition calculating function
23 Storage device
24 Sensitivity calibration execution determining function
25 Sensitivity calibration execution function
26 Mass conversion function
27 Display processing function
3 Display portion
4 Operation switch
41 Digit setting key
42 Count setting key
43 Unit setting key
44 Tolerance input/release key
45 Sensitivity calibration execution key
5 Temperature sensor
6a Sensitivity calibrating mechanism
6b Motor

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

The first feature of the electronic balance of the present invention is that it includes a tolerance input unit for inputting a tolerance resulting from the temperature variation with respect to a maximum weighed value or a predictable approximate weighed value; an allowable temperature variation calculating unit for calculating an allowable temperature variation corresponding to the tolerance; and a sensitivity calibration determining unit for detecting whether the allowable temperature variation is generated or not, so as to determine whether to execute the sensitivity calibration or not. In addition, whenever the allowable temperature variation is generated, an automatic sensitivity calibration is executed. In addition, the second feature of the electronic balance is to input a tolerance smaller than the input tolerance during the automatic sensitivity calibration. When the balance reaches the temperature variation corresponding to the tolerance, an alarm is shown on a display portion.

Therefore, an optimal electronic balance has perfectly a configuration with the above two features.

Embodiment 1

An electronic balance according to an embodiment of the present invention is illustrated with the accompanying drawings. FIG. 1 is a block diagram showing the configuration of the electronic balance of an embodiment. The electronic balance includes a load detecting portion 1 for detecting either a load of an object to be weighed 12 loaded on a tray 11 or a load of internal weights 13, and outputting a detecting signal; a temperature sensor 5 for detecting the temperature in the load detecting portion 1 and outputting a detecting signal; a display portion 3 for displaying the mass of the object to be weighed 12 or a tolerance with respect to the temperature; a sensitivity calibrating mechanism 6a for driving a motor 6b to increase or reduce the internal weights 13 to the load detecting portion 1; an operating switch 4 composed of a switch, said switch is moved respectively with a digit setting key 41, a count setting key 42, an unit setting key 43, a tolerance input/release key 44, and a sensitivity calibration execution key 45, for setting the tolerance resulting from the temperature variation; and a processing portion 2 for converting the load detecting signal from the load detecting portion 1 into a mass data and showing the mass data on the display portion 3, and further implementing a sensitivity calibration execution determining process.

The processing portion 2 has an electronic circuit configured in microcomputer including a universal A/D converter, an I/O interface, a central processing unit (CPU), and a memory (not shown). Further, the processing portion 2 has an operation control program built with a tolerance input function 21 for receiving a tolerance input from the operating switch 4, and converting the tolerance input into a tolerance data; a sensitivity calibration execution condition calculating function 22 for calculating an allowable temperature variation for executing the sensitivity calibration according to the tolerance value and a temperature coefficient of the sensitivity coefficient of the electronic balance; a sensitivity calibration execution determining function 24 for detecting whether the temperature variation after the previous sensitivity calibration reaches the allowable temperature variation, so as to determine whether to execute the sensitivity calibration; a sensitivity calibration execution function 25 for sending a control signal to the sensitivity calibrating mechanism 6a for executing the sensitivity calibration; a mass conversion function 26; and a display processing function 27. In addition, the processing portion 2 also includes a storage device 23 pre-stored with the operation control program, the allowable temperature variation, the temperature error characteristic value, and the temperature of the previous sensitivity calibration.

Figure 2:
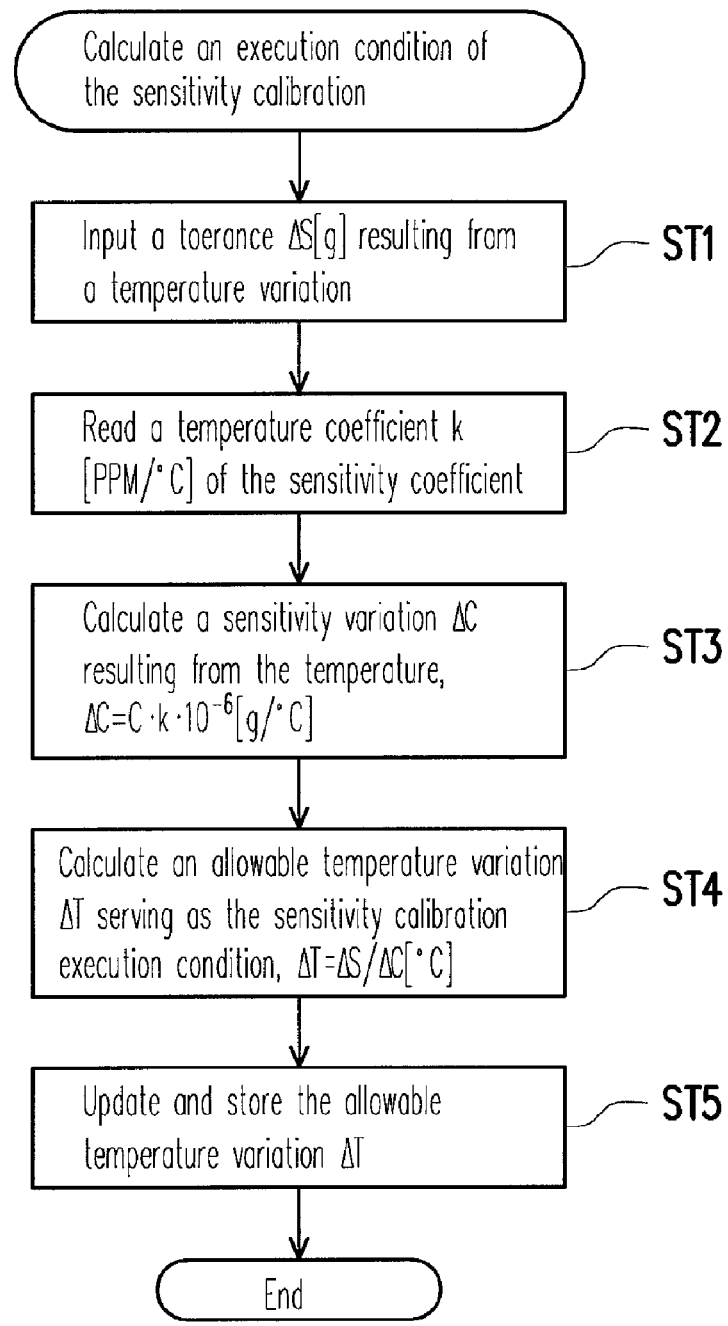
FIG. 2 is a flow chart showing the process of calculating an execution condition of the sensitivity calibration according to an embodiment.

FIG. 2 is a flow chart showing the process of calculating an execution condition of the sensitivity calibration of the processing portion 2. Referring to FIGS. 1 and 2, the process of calculating the execution condition of the sensitivity calibration is described. When the digit setting key 41, the count setting key 42, and the unit setting key 43 of the operating switch 4 are used to set a tolerance $\Delta S$ [g] resulting from a temperature variation, and a tolerance input/release key 44 is pressed to input the tolerance $\Delta S$ [g], the tolerance input function 21 is employed to read the tolerance $\Delta S$ into the processing portion 2 (ST1). Next, a variation rate k [PPM/° C.] of the sensitivity coefficient caused by the temperature is read from the storage device 23 (ST2). Then, the sensitivity calibration execution condition calculating function 22 is adopted to calculate by an equation (I) a sensitivity variation ΔC [g/° C.] resulting from the temperature (ST3).

$$\Delta C = C \cdot k \cdot 10^{-6} [g/° C.] \quad (1)$$

Here, C[g] is the maximum weighed value.

Next, an allowable temperature variation ΔT [° C.] serving as the sensitivity calibration execution condition is calculated by an equation (2) (ST4).

$$\Delta T = \Delta S / \Delta C [° C.] \quad (2)$$

Whenever the tolerance ΔS is changed, the allowable temperature variation ΔT is updated, and the updated allowable temperature variation ΔT is stored in the storage device 23 (ST5).

Figure 3:
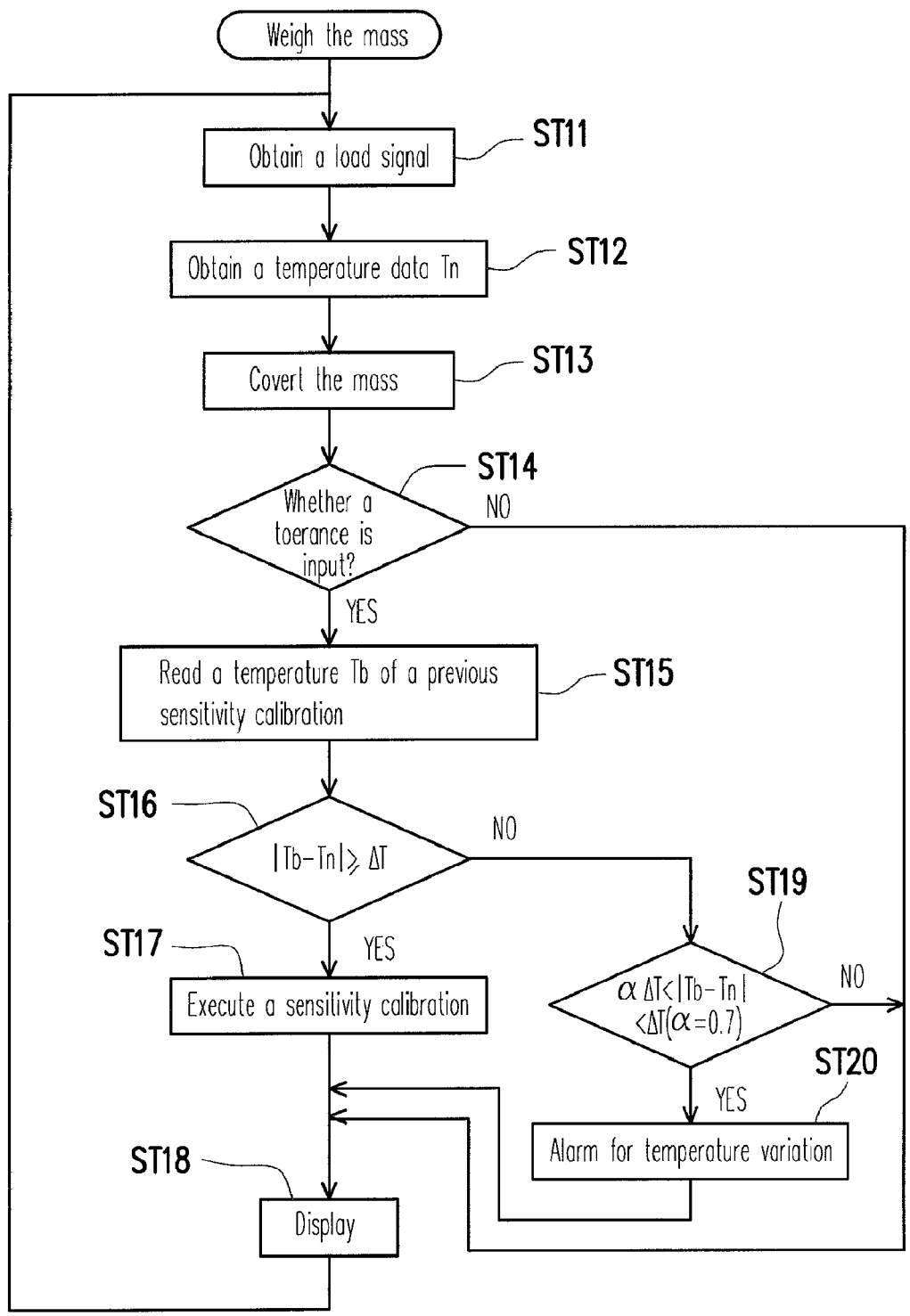
FIG. 3 is a flow chart showing the process of a sensitivity calibration according to an embodiment.

FIG. 3 is a flow chart showing the process of weighing and automatic sensitivity calibration of the electronic balance.

In each sampling period, a load detecting signal is read from the load detecting portion 1 into the processing portion 2, and is then averaged (ST11). Next, the detecting signal is read from a temperature sensor 5 into the processing portion 2 (ST12). The average load value is multiplied by the sensitivity coefficient corresponding to the measured temperature, and the product is converted into a mass value (ST13). It is checked whether a tolerance is input (ST14). When a tolerance is input (YES), a temperature Tb of a previous sensitivity calibration is read from the storage device 23 (ST15), and a difference between the temperature Tb and a current temperature Tn is calculated. Then, it is detected whether the difference reaches or exceeds an allowable temperature variation ΔT (ST16), and if the difference exceeds ΔT, a sensitivity calibration is executed (ST17). After the above sensitivity calibration and before the next sensitivity calibration, the weighing is performed by using the calibrated sensitivity coefficient, and the mass value is displayed (ST18). Thereafter, the next load data is sampled. In another aspect, in ST14, when the tolerance input/release key 44 is released (NO), the mass value calculated in ST13 is displayed.

Further, a tolerance αΔS (0.7<α<1) smaller than the tolerance AS is pre-input from the operating switch 4 to serve as a sensitivity calibration execution condition. Therefore, if the temperature variation exceeds αΔT (ST19), an alarm is shown on the display portion 3, for example, displaying "Exceeding Δ.Δ° C." (ST20). After the user confirms the alarm, it can be predicted that the next sensitivity calibration moment is approaching. After the user presses the sensitivity calibration execution key 45 to perform the sensitivity calibration, the weighing is performed, so as to avoid interruptions in the operation and to enhance the operation efficiency.

Next, the relation between the tolerance and the allowable temperature variation ΔT of the electronic balance in this embodiment is described in detail below. In an embodiment of claim 1 of the present invention, for an electronic balance with a maximum weighed value of 300.000 g and a temperature coefficient of 10 PPM, if 0.010 g is input as a tolerance AS, according to the equation (1), whenever the temperature is varied by 1° C., the sensitivity variation AC is 0.003 g/° C., and according to the equation (2), the allowable temperature variation ΔT is 3.3° C. That is, the tolerance is set as 0.01 g and is used, and the sensitivity calibration is performed only when the temperature is varied by 3.3° C., so as to reduce the redundant sensitivity calibration.

Further, in other embodiments, for an electronic balance with a maximum weighed value/minimum display value of 300 g/0.001 g and a temperature coefficient of 10 PPM, a predictable approximate mass, usually serving as the object in a weighing operation, of the object to be weighed, for example, 30 g is input, a tolerance of 0.001 g is also input, and C=30. According to the equation (1), whenever the temperature is varied by 1° C., the sensitivity variation AC is 0.0003 g/° C., and according to the equation (2), the allowable temperature variation ΔT is 3.3° C. That is, the sensitivity variation AC resulting from the temperature variation is 0.0003 g/° C. Therefore, even if a tolerance of 0.001 g is used, the sensitivity calibration is performed only when the temperature is varied by 3.3° C., so as to greatly reduce the frequency of sensitivity calibration.

In addition, in a second embodiment of the present invention, the tolerance ΔS (for example, 0.010 g) employed in the first embodiment and the tolerance αΔS (for example, 0.007 g) smaller than the tolerance ΔS are input. αΔS, instead of ΔS, is substituted into the equation (2) of the sensitivity calibration execution condition calculating function 22, and 2.3° C. is obtained. The sensitivity calibration execution determining function 24 detects whether the temperature reaches 2.3° C. (ST19), and if the determination is positive, an alarm is shown on the display portion 3 (ST20). At this time, the user determines whether to perform a sensitivity calibration, and if a sensitivity calibration is required, the sensitivity calibration execution key 45 is pressed for executing sensitivity calibration. In this manner, the sensitivity calibration can be performed earlier than the automatic sensitivity calibration. Moreover, when the sensitivity calibration execution key 45 is not pressed, the weighed value is displayed together with the alarm, and then the load value is sampled.

INDUSTRIAL APPLICABILITY

The electronic balance is provided with an automatic sensitivity calibration function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic balance, comprising:
   a load detecting portion, for detecting a load of an object to be weighed, and outputting a detecting signal;
   a mass calculating unit, for multiplying the detecting signal by a sensitivity coefficient, so as to calculate the mass of the object to be weighed;
   a temperature detecting unit, for detecting a temperature of the load detecting portion;
   a sensitivity calibrating unit with internal weights,
   the electronic balance is capable of automatically performing a sensitivity calibration when a temperature variation after a previous sensitivity calibration is detected and exceeds a certain value; and the electronic balance is characterized in that it includes:
   a tolerance input unit, for inputting a tolerance resulting from the temperature variation with respect to a maximum weighed value or a predictable approximate weighed value;
   an allowable temperature variation calculating unit, for calculating an allowable temperature variation corresponding to the tolerance; and a sensitivity calibration execution determining unit, for detecting whether the allowable temperature variation is generated or not, so as to determine whether to execute the automatic sensitivity calibration or not, wherein whenever the allowable temperature variation is generated, the automatic sensitivity calibration is executed; wherein the electronic balance further comprising a unit for inputting the tolerance and another tolerance smaller than the said tolerance, which corresponds to the temperature variation for executing the automatic sensitivity calibration, and the unit shows an alarm and a weighed value on a display portion when the temperature variation corresponding to the smaller tolerance is reached.

* * * * *